US012609399B2

(12) United States Patent
Kellner et al.

(10) Patent No.: US 12,609,399 B2
(45) Date of Patent: Apr. 21, 2026

(54) BATTERY MODULE HOUSING FOR ACCOMMODATING AT LEAST ONE CELL STACK FOR USE IN A MOTOR VEHICLE

(71) Applicant: Dr. Ing. h.c. F. Porsche Aktiengesellschaft, Stuttgart (DE)

(72) Inventors: Philipp Kellner, Renningen (DE); Christopher Volkmer, Niefern-Öschelbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 620 days.

(21) Appl. No.: 17/984,298

(22) Filed: Nov. 10, 2022

(65) Prior Publication Data

US 2023/0147509 A1     May 11, 2023

(30) Foreign Application Priority Data

Nov. 11, 2021     (DE) ..................... 10 2021 129 316.2

(51) Int. Cl.
| | |
|---|---|
| *H01M 50/271* | (2021.01) |
| *B60L 50/64* | (2019.01) |
| *H01M 50/224* | (2021.01) |
| *H01M 50/229* | (2021.01) |

(Continued)

(52) U.S. Cl.
CPC ........... *H01M 50/271* (2021.01); *B60L 50/64* (2019.02); *H01M 50/224* (2021.01); *H01M 50/229* (2021.01); *H01M 50/24* (2021.01); *H01M 50/249* (2021.01); *H01M 2220/20* (2013.01)

(58) Field of Classification Search
CPC ............. H01M 50/271; H01M 50/224; H01M 50/229; H01M 50/24; H01M 50/249; H01M 2220/20; H01M 50/233; H01M 50/204; H01M 50/244; B60L 50/64; Y02E 60/10
See application file for complete search history.

(56) References Cited

U.S. PATENT DOCUMENTS

| | | | |
|---|---|---|---|
| 2019/0165437 A1* | 5/2019 | Kellner | ............. H01M 10/6556 |
| 2023/0082924 A1* | 3/2023 | Wang | .................. H01M 50/249 |
| | | | 429/163 |
| 2024/0128567 A1* | 4/2024 | Sedlmayr | ............ H01M 50/271 |

FOREIGN PATENT DOCUMENTS

| | | | | |
|---|---|---|---|---|
| CN | 214280134 | * | 9/2021 | ............. B60L 50/64 |
| CN | 214280134 U | | 9/2021 | |
| DE | 10 2016217935 | * | 3/2018 | ............. H01M 2/02 |

(Continued)

OTHER PUBLICATIONS

CN 214280134 machine English translation (Year: 2021).*
DE 10 2016217935 machine English translation (Year: 2018).*

*Primary Examiner* — Michael L Dignan
(74) *Attorney, Agent, or Firm* — Buchanan Ingersoll & Rooney PC

(57) ABSTRACT

A battery module housing for accommodating at least one cell stack for use in a motor vehicle. The battery module housing includes a plurality of housing units for accommodating battery cells, as well as a front and a rear cover member for closing the housing units. The housing units are designed as extrusion profiles and include a front and a rear face-side opening for introducing the battery cells and a housing wall arranged between the openings. The housing units are positively connected to one another via their housing wall and the front and rear cover elements are designed to cover the front and rear face-side openings of the housing units.

19 Claims, 6 Drawing Sheets

(51) Int. Cl.
    *H01M 50/24*       (2021.01)
    *H01M 50/249*     (2021.01)

(56)              References Cited

FOREIGN PATENT DOCUMENTS

| | | | | | |
|---|---|---|---|---|---|
| DE | 102016217935 | A1 | 3/2018 | | |
| DE | 102017202354 | A1 | 8/2018 | | |
| DE | 102017005400 | A1 | 12/2018 | | |
| DE | 102020105607 | B3 | 6/2021 | | |
| EP | 0477125 | * | 9/1990 | ............. | A47B 87/02 |

* cited by examiner

80

BATTERY MODULE HOUSING FOR ACCOMMODATING AT LEAST ONE CELL STACK FOR USE IN A MOTOR VEHICLE

CROSS-REFERENCE TO RELATED APPLICATION

This application claims priority to German Patent Application No. 10 2021 129 316.2, filed Nov. 11, 2021, the content of such application being incorporated by reference herein in its entirety.

FIELD OF THE INVENTION

The present invention relates to a battery module housing, a battery system comprising a battery module housing, and a motor vehicle having such a battery module housing, in particular having such a battery system.

SUMMARY OF THE INVENTION

In order to accommodate cell stacks for use in at least partially electrically operated motor vehicles, the use of battery module housings is known. In the battery module housings, the battery cells of the cell stacks can be accommodated and interconnected. The outer dimensions of the battery module housings correspond to about the dimensions of the cell stacks. For many reasons, in particular in terms of manufacturing technology and costs, the manufacture of battery module housings via extrusion processes has now been established.

Disadvantageously, the maximum housing sizes are limited in the manufacture of battery module housings via extrusion processes due to the lack of availability to manufacture necessary large presses. Moreover, the wall thicknesses in larger profiles must be thicker in terms of manufacturing technology, which in turn leads to a high weight of the battery module housing and makes the use of larger battery module housings disadvantageous.

Described herein is a battery module housing for accommodating at least one cell stack for use in a motor vehicle, which, despite simple and inexpensive manufacturing, has a large housing size and a comparatively low weight while enabling a compact arrangement of at least one cell stack.

Technical features that are disclosed regarding the battery module housing according to aspects of the invention apply in connection with the battery system according to aspects of the invention and the motor vehicle according to aspects of the invention, and vice versa, so that reference is or can always be mutually made with respect to the disclosure regarding the individual aspects of the invention.

According to aspects of the invention, a battery module housing for accommodating at least one cell stack for use in a motor vehicle is provided. The battery module housing according to aspects of the invention comprises a plurality of housing units for accommodating battery cells, a front and a rear cover element for closing the housing units, wherein the housing units are designed as extrusion profiles and comprise a front and a rear face-side opening for introducing the battery cells and a housing wall arranged between the openings. According to the present invention, it is provided that the housing units are positively (e.g., fixedly) connected to one another via their housing wall and the front and rear cover elements are designed to cover the front and rear face-side openings of the housing units.

In contrast to the known battery module housings manufactured via extrusion methods for use in a motor vehicle, the battery module housing according to aspects of the invention can also be manufactured in large dimensions from a plurality of housing units due to the multi-part design, so that even large cell stacks or a plurality of individual cell stacks can be accommodated and a large number of battery cells can thus be arranged in a compact manner within the battery module housing and can be flexibly interconnected. Due to the positive connection provided according to aspects of the invention between the individual housing units, a particularly stable design of a battery module housing can moreover be produced. The possibility of connecting the individual housing units moreover allows simple and inexpensive manufacturing as well as a weight-optimized design of a battery module housing for use in a motor vehicle.

The battery module housing according to the present invention for use in a motor vehicle may preferably be used in an at least partially electrically operated car or a truck. According to the present invention, it is preferably provided that the battery module housing comprises at least two housing units which are positively connected to one another. The positive connection can be formed directly or indirectly in this case. Accordingly, preferably precisely two cover elements for closing the housing units may furthermore also be provided, which cover elements cover at least the front and rear face-side openings of the two housing units connected to one another. The housing wall of a housing unit may furthermore preferably comprise bottom and top surfaces, which are longitudinally arranged along the extrusion direction and are connected to one another via the side walls arranged perpendicularly thereto. The housing units are moreover preferably connected to one another in such a way that the housing walls of the housing units respectively adjacent to one another are positively connected to one another. According to the present invention, a cell stack can in particular be understood to mean a unit of interconnected battery cells. According to aspects of the invention, a housing unit can preferably be understood to mean a discrete detachable unit for forming a housing or for forming a battery module housing, wherein the housing unit can in particular be monolithic. In the context of the invention, a cover element can in particular be understood to mean an element designed to cover the openings of the housing units or to close the housing units. According to aspects of the invention, an extrusion profile can furthermore be understood to mean a profile produced by an extrusion process. Finally, a housing wall can in particular be understood to mean the complete frame comprising side walls, bottom surfaces and top surfaces of a housing unit.

In the context of an arrangement of battery cells as compact as possible while ensuring flexible cell interconnection, it may in particular be advantageous if at least two housing units are provided for accommodating battery cells, wherein the housing units are preferably positively connected to one another via side walls of the respective housing wall arranged along an extrusion direction, wherein each housing unit comprises in particular a separating wall, which separates the housing unit into two chambers. Due to the arrangement of two housing units positively connected to one another, a battery module housing can in particular be designed to be larger in size so that larger cell stacks or a plurality of cell stacks having more battery cells can be arranged, which can then be flexibly connected to one another on a larger area.

Furthermore, in the context of a compact arrangement of battery cells, while taking into account a minimization of a fire hazard, it may advantageously be provided that between two positively connected housing units within a joining region, an intermediate chamber for accommodating air and/or a fire protection layer is provided, wherein the adjacent side walls of the two housing units are preferably directly connected to one another via a weld connection. A chamber for accommodating air and/or a fire protection layer can preferably be designed to be correspondingly narrow, for example in the form of a tolerance-related gap.

Moreover, it may be advantageous if an intermediate chamber for accommodating battery cells is provided between two positively connected housing units within a joining region, wherein the adjacent side walls of the two housing units are preferably indirectly positively connected to one another by means of additional connecting elements. Such an arrangement not only ensures a particularly compact arrangement of battery cells but moreover ensures flexible cell interconnection. A chamber for accommodating battery cells can preferably be designed to be correspondingly large in order to provide sufficient space for the accommodation of the cells.

Moreover, it may in particular be advantageous if the additional connecting elements are positively connected to a first and a second housing unit, wherein the additional connecting elements are preferably positively connected to a first housing unit via a first side and to a second housing unit via a second side, wherein the additional connecting elements are in particular in the form of metal sheets. Such a design of a battery module housing in particular enables a constructively simple and fast connection of two housing units via such additional connecting elements.

Likewise, it may be advantageous if the positively connected housing units are connected to one another both mechanically and in a media-tight manner, wherein the positive connection points are arranged between two housing units, preferably on the bottom and top surfaces of the housing units. A media-tight connection can in particular prevent air and/or water from entering the battery module housing, which significantly reduces the risk of a short circuit or battery fire.

In the context of a constructively simple and inexpensive manner of introducing a positive connection between two housing units, it can advantageously be provided according to the present invention that the positive connection is designed in the form of an adhesive connection or a weld connection, in particular a friction stir weld connection or a laser weld connection. With the aid of a friction stir weld connection or a laser weld connection, it is in particular possible to connect two housing units to one another along their side surfaces in a fast and targeted manner.

With regard to a simultaneously stable and weight-optimized design of a battery module housing according to the present invention, it is advantageously likewise conceivable that the housing units are formed from an aluminum material and/or a magnesium material and/or a fiber-reinforced plastic.

Furthermore, the subject matter of the invention is also a battery system for use in a motor vehicle, comprising a battery module housing described above and a plurality of cell stacks arranged within the battery module housing, for example at least three or four cell stacks for driving the motor vehicle. The battery system according to aspects of the invention thus has the same advantages as already extensively described with respect to the battery module housing according to aspects of the invention. Moreover, a unit consisting of a plurality of battery systems, e.g., three or four battery systems, which are positively connected to one another may be provided according to the present invention.

In the context of an arrangement of battery cells as compact as possible while ensuring flexible cell interconnection, it may furthermore be provided according to aspects of the invention that at least three cell stacks are provided, wherein preferably, a first cell stack is arranged within a first housing unit, a second cell stack is arranged within a second housing unit positively connected to the first housing unit, and a third cell stack is arranged between the first and second housing units in an intermediate chamber. In the arrangement provided according to the present invention of three cell stacks, two battery module housings can for example be positively connected to one another via additional connecting elements so that an intermediate chamber for the arrangement of a further cell stack is arranged between the first and the second battery module housing.

Furthermore, the subject matter of the invention is also a motor vehicle comprising a battery module housing described above, in particular comprising a battery system described above. The motor vehicle according to aspects of the invention thus has the same advantages as already extensively described with respect to the battery module housing according to aspects of the invention and the battery system according to aspects of the invention. The motor vehicle can preferably be designed in the form of an at least partially electrically operated motor vehicle, preferably in the form of a hybrid vehicle or an electric vehicle. Preferably, a battery module housing according to the present invention or a battery system according to the present invention can be arranged in the transverse direction between two side sills within a motor vehicle. In this case, the battery module housing can in particular be directly connected, for example screwed, to the body of the motor vehicle without additional battery box or the like.

BRIEF DESCRIPTION OF THE DRAWINGS

Further advantages, features, and details of the invention arise from the following description, in which exemplary embodiments of the invention are described in detail with reference to the drawings.

DETAILED DESCRIPTION OF THE INVENTION

Figure 1:
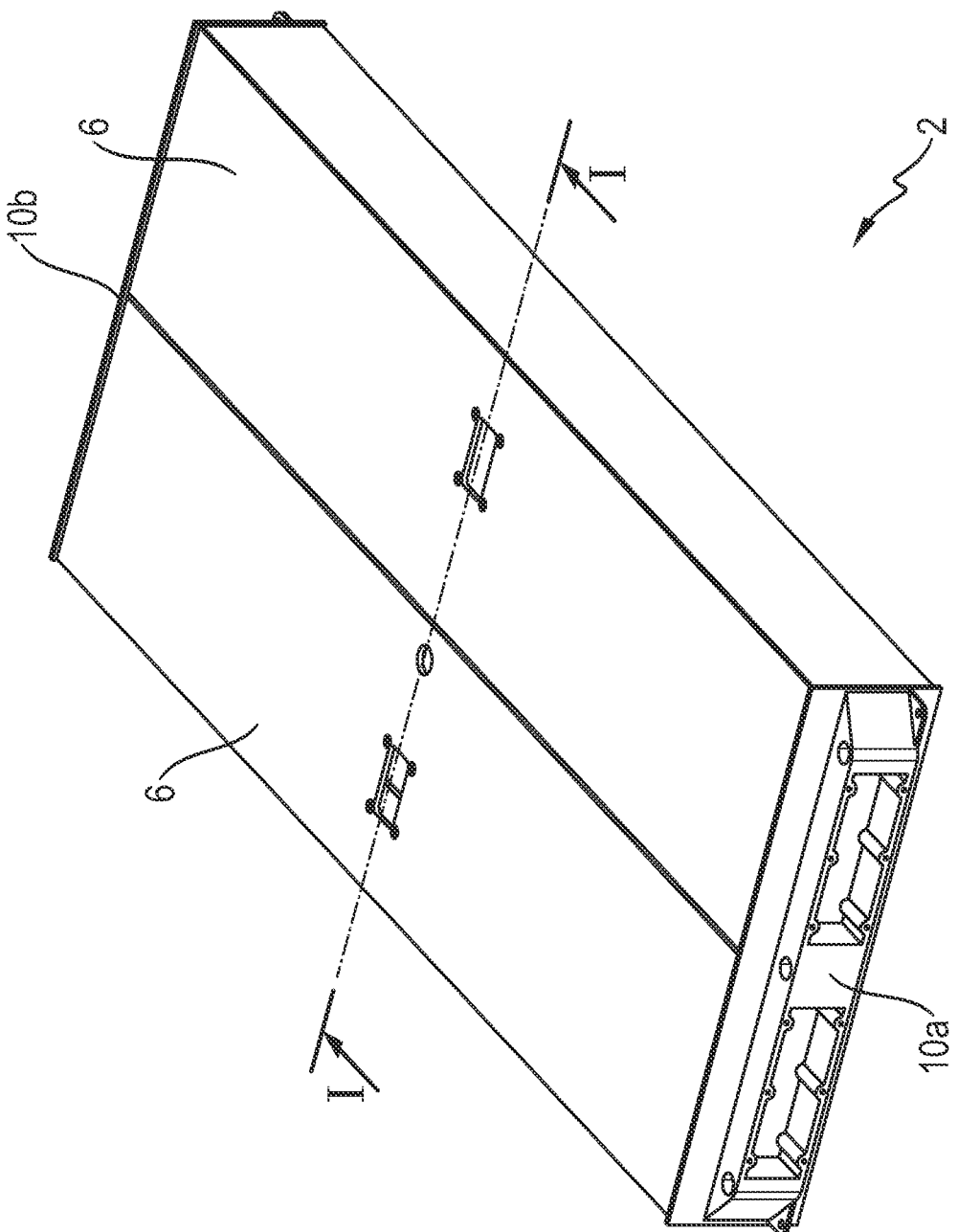
FIG. 1 schematically shows a battery module housing according to aspects of the invention for accommodating at least one cell stack for use in a motor vehicle, according to a first exemplary embodiment in a plan view, FIG. 2 schematically shows a battery module housing according to aspects of the invention for accommodating at least one cell stack for use in a motor vehicle, according to a first exemplary embodiment in a plan view without an arrangement of a front cover element, FIG. 3 schematically shows a battery system according to aspects of the invention for use in a motor vehicle, according to a first exemplary embodiment in a cross-sectional view according to a cross section along the cross-sectional axis I-I according to FIG. 1, FIG. 4 schematically shows a battery system according to aspects of the invention for use in a motor vehicle, according to a second exemplary embodiment in a cross-sectional view according to a cross section along the cross-sectional axis I-I according to FIG. 1, FIG. 5 schematically shows a battery system according to aspects of the invention for use in a motor vehicle, according to a third exemplary embodiment in a cross-sectional view according to a cross section along the cross-sectional axis I-I according to FIG. 1, FIG. 6 schematically shows a motor vehicle comprising a battery system according to aspects of the invention.

FIG. 1 shows a battery module housing 2 according to aspects of the invention for accommodating at least one cell stack 4 for use in an automobile 80, according to a first exemplary embodiment in a plan view.

Figure 2:
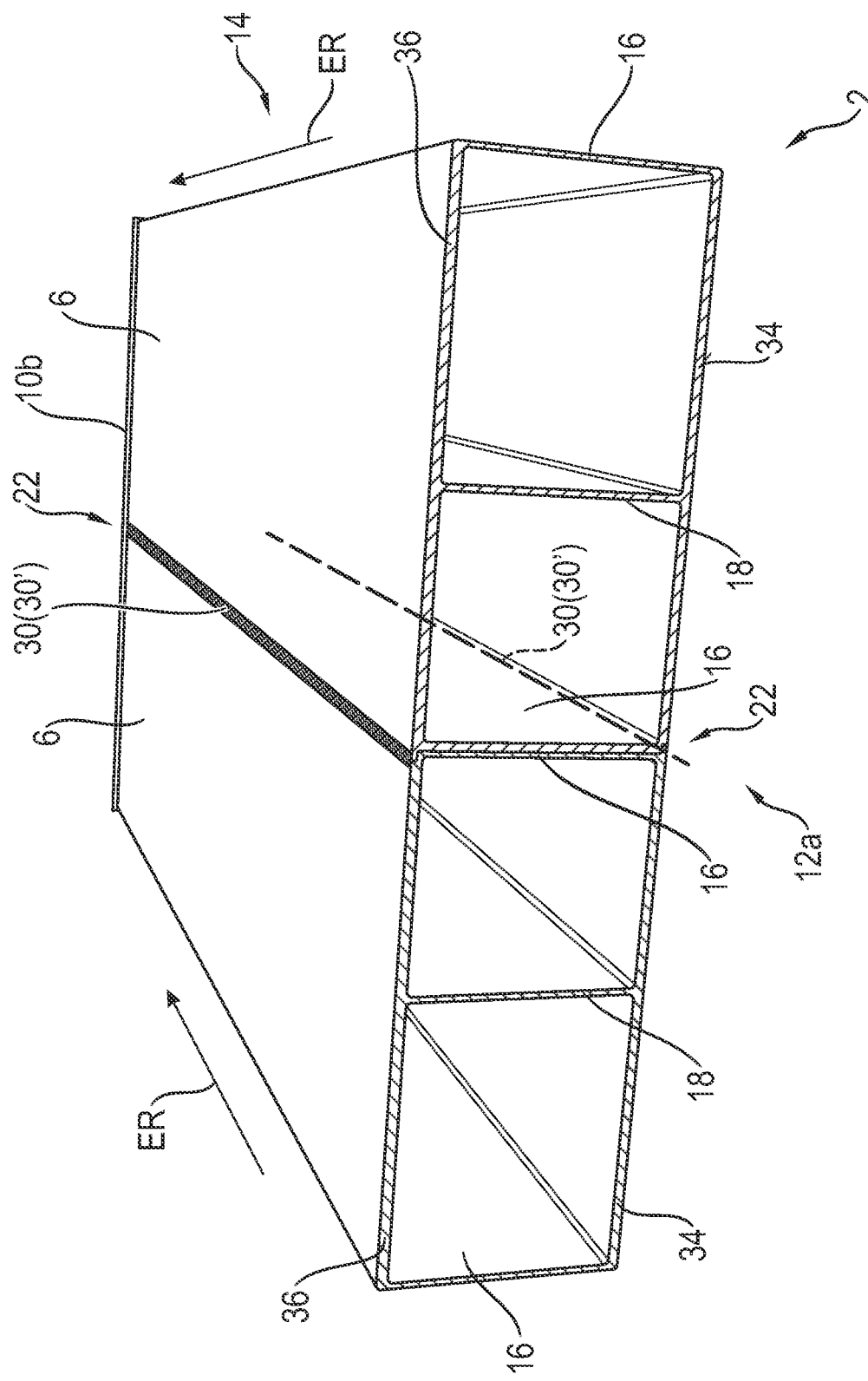

FIG. 2 shows a battery module housing 2 according to aspects of the invention for accommodating at least one cell stack 4 for use in a motor vehicle 80, according to a first exemplary embodiment in a plan view without an arrangement of a front cover element 10a.

As can be seen according to FIGS. 1 and 2, the battery module housing 2 according to the aspects of invention for accommodating at least one cell stack 4 (see FIG. 3) for use in a motor vehicle 80 (see FIG. 6) comprises a plurality of housing units 6 for accommodating battery cells 8 (see FIG. 3), a front and a rear cover member 10a, 10b for closing the housing units 6, wherein the housing units 6 are designed as extrusion profiles and comprise a front and a rear face-side opening 12a, 12b for introducing the battery cells 8 and one housing wall 14 arranged between the openings 12a, 12b. As can be seen in particular in FIG. 2, the housing units 6 are in the present case positively connected to one another via their housing wall 14 in a joining region 22. The front and rear cover members 10a, 10b are furthermore designed to cover the front and rear face-side openings 12a, 12b of the housing units 6. In the present case, the positive connection is in the form of a weld connection 30' arranged at the connection points 30.

As shown in FIG. 2, in the present case, two housing units 6 are provided for accommodating battery cells 8, wherein the housing units 6 are in the present case positively connected to one another via side walls 16 of the respective housing wall 14 arranged along an extrusion direction ER. Each housing unit 6 additionally comprises a separating wall 18, which separates the housing unit 6 into two chambers. As can be seen in the present case, the housing wall 14 of each housing unit 6 comprises bottom and top surfaces 34, 36 which are arranged longitudinally along the extrusion direction ER and are connected to one another via the side walls 16 arranged perpendicularly thereto.

Figure 3:
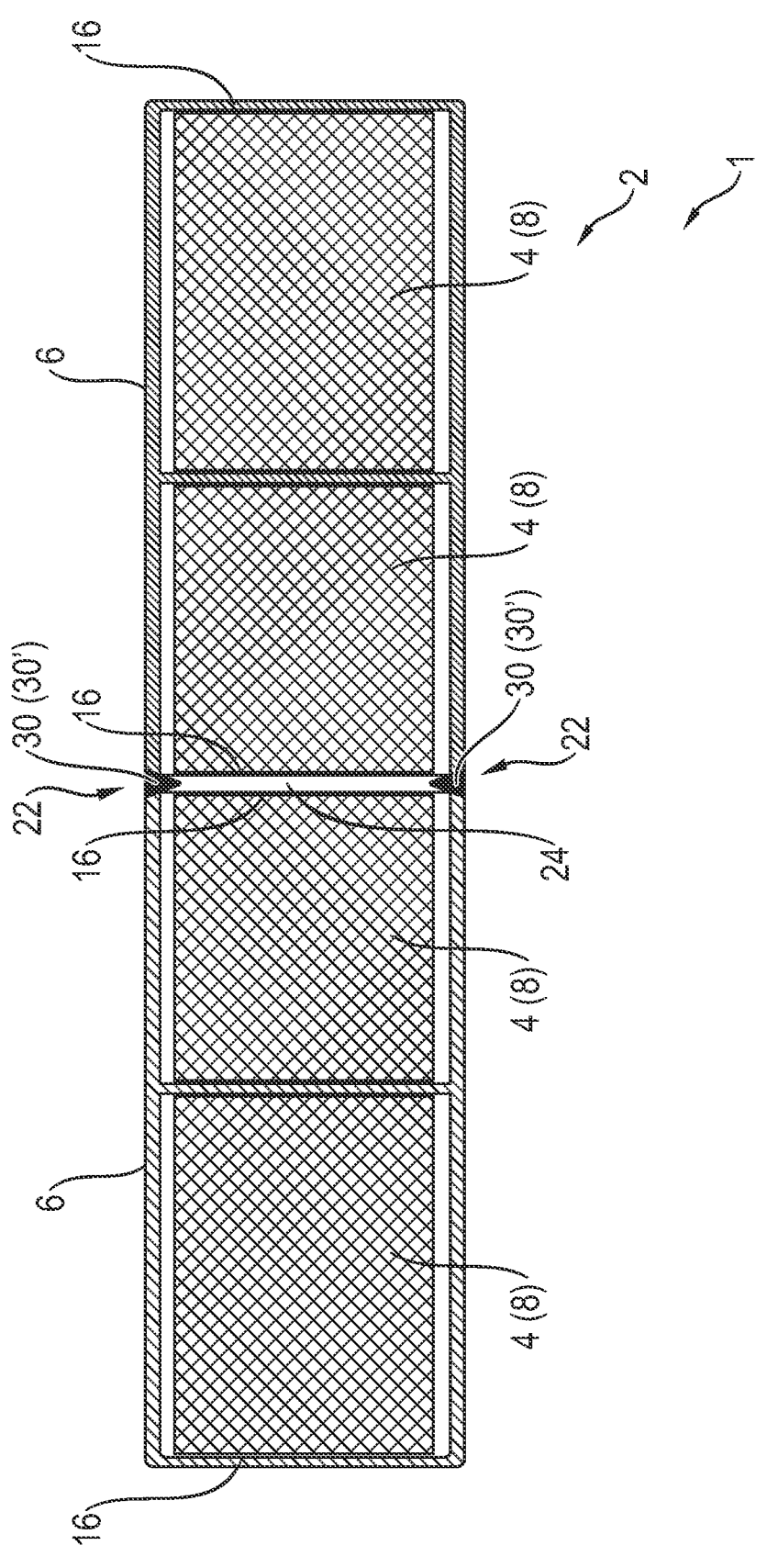

FIG. 3 shows a battery system 1 according to aspects of the invention for use in a motor vehicle 80, according to a first exemplary embodiment in a cross-sectional view according to a cross section along the cross-sectional axis I-I according to FIG. 1.

As can be seen according to FIG. 3, the battery system 1 comprises a battery module housing 2 and a plurality of cell stacks 4 having battery cells 8 arranged within the battery module housing 2 for driving the motor vehicle 80.

As shown in FIG. 3, an intermediate chamber 24 for accommodating air and/or a fire protection layer is provided between two positively connected housing units 6 within a joining region 22, wherein the adjacent side walls 16 of the two housing units 6 are in the present case directly connected to one another via a weld connection 30'.

Figure 4:
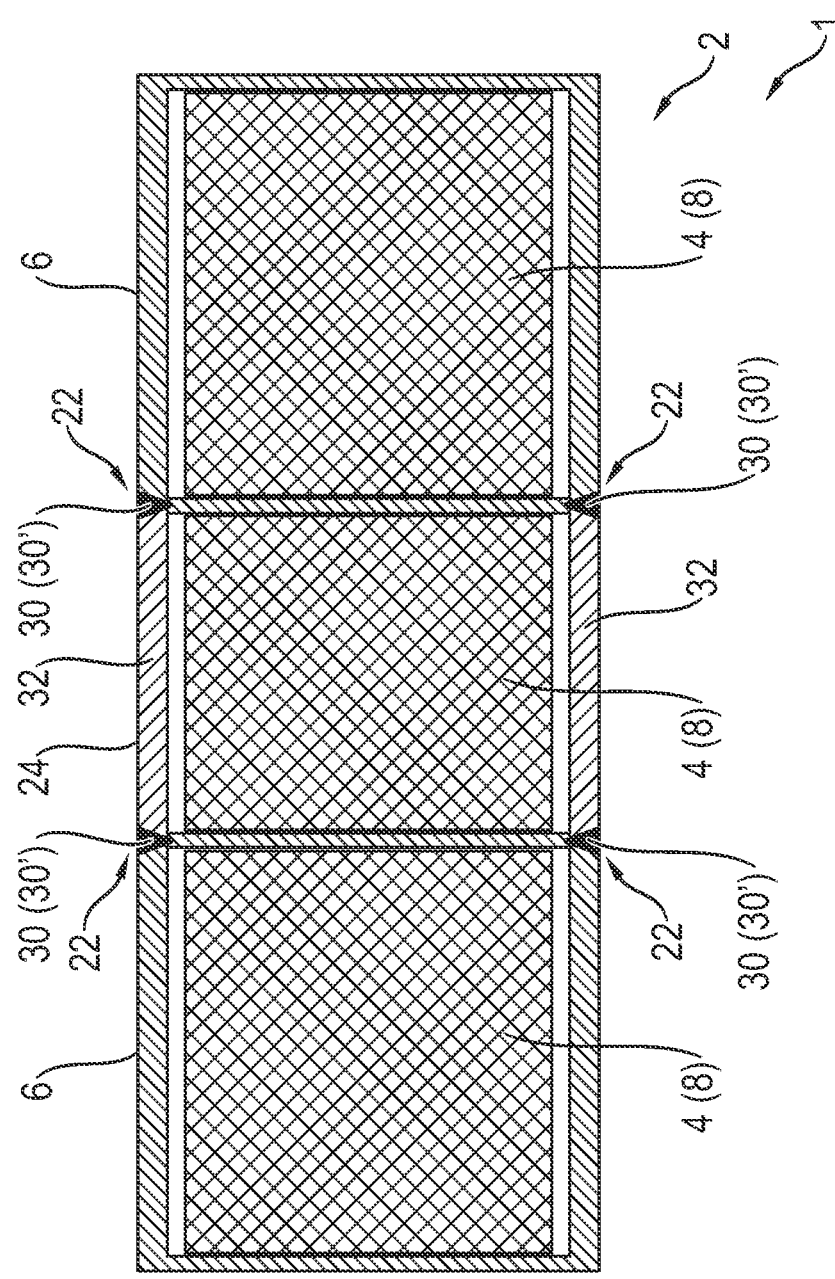

FIG. 4 shows a battery system 1 according to aspects of the invention for use in a motor vehicle 80, according to a second exemplary embodiment in a cross-sectional view according to a cross section along the cross-sectional axis I-I according to FIG. 1.

As can be seen according to FIG. 4, the battery system 1 comprises a battery module housing 2 and a plurality of cell stacks 4 having battery cells 8 arranged within the battery module housing 2 for driving the motor vehicle 80.

As shown in FIG. 4, the battery system 1 according to FIG. 4 comprises three cell stacks 4, wherein a first cell stack 4 is arranged within a first housing unit 6, a second cell stack 4 is arranged within a second housing unit 6 positively connected to the first housing unit 6, and a third cell stack 4 is arranged between the first and second housing units 2 in an intermediate chamber 24.

It can furthermore be seen that the two housing units 6 are indirectly positively connected to one another via additional connecting elements 32, wherein the additional connecting elements 32 are positively connected to a first and a second housing unit 6 in joining regions 22, wherein the additional connecting elements 32 are positively connected to a first housing unit 6 via a first side and to a second housing unit 6 via a second side. In the present case, the positive connection is in the form of a weld connection 30' arranged at the connection points 30.

Figure 5:
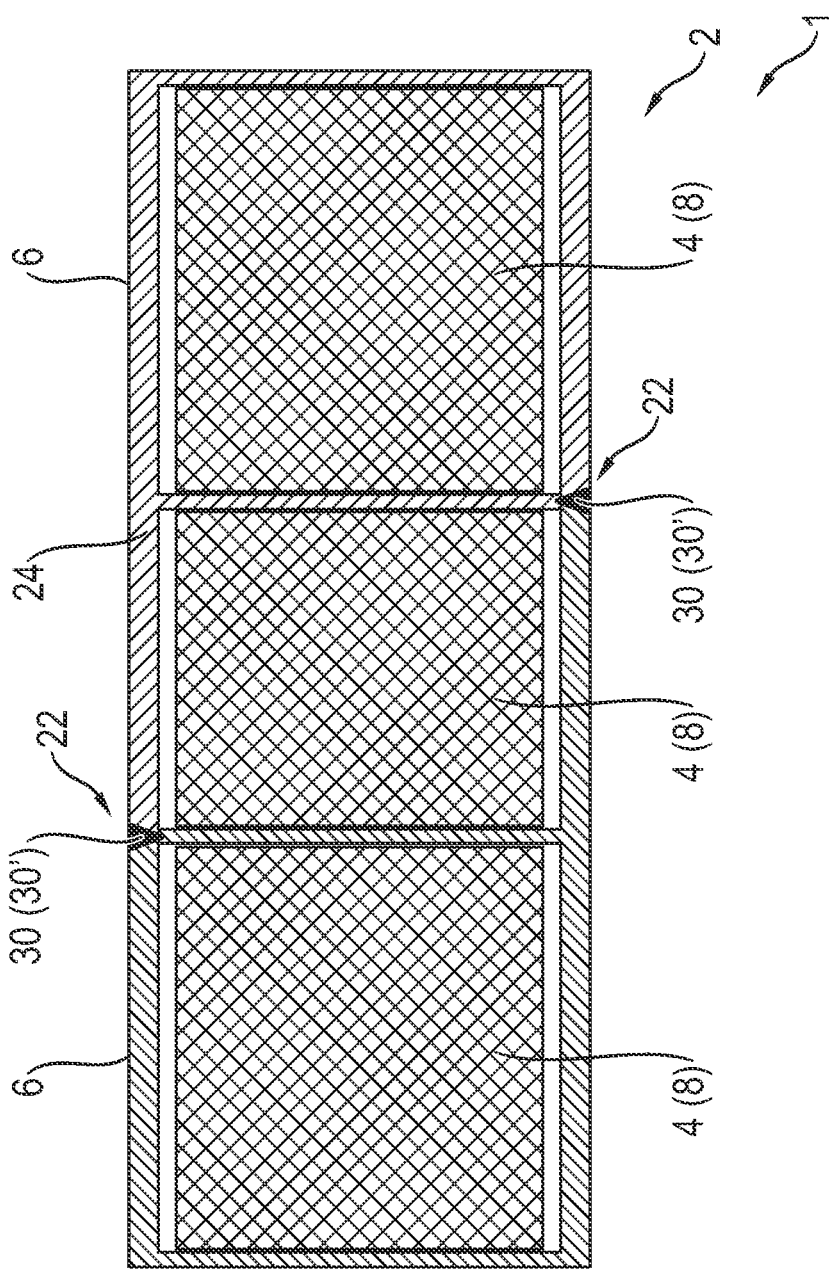

FIG. 5 shows a battery system 1 according to aspects of the invention for use in a motor vehicle, according to a third exemplary embodiment in a cross-sectional view according to a cross section along the cross-sectional axis I-I according to FIG. 1.

As can be seen according to FIG. 5, even in an embodiment without additional connecting elements 32, an intermediate chamber 24 can be provided for accommodating at least one cell stack 4 by means of a corresponding design of the bottom and top surfaces 34, 36 of the housing wall 14 of the housing units 6.

Figure 6:
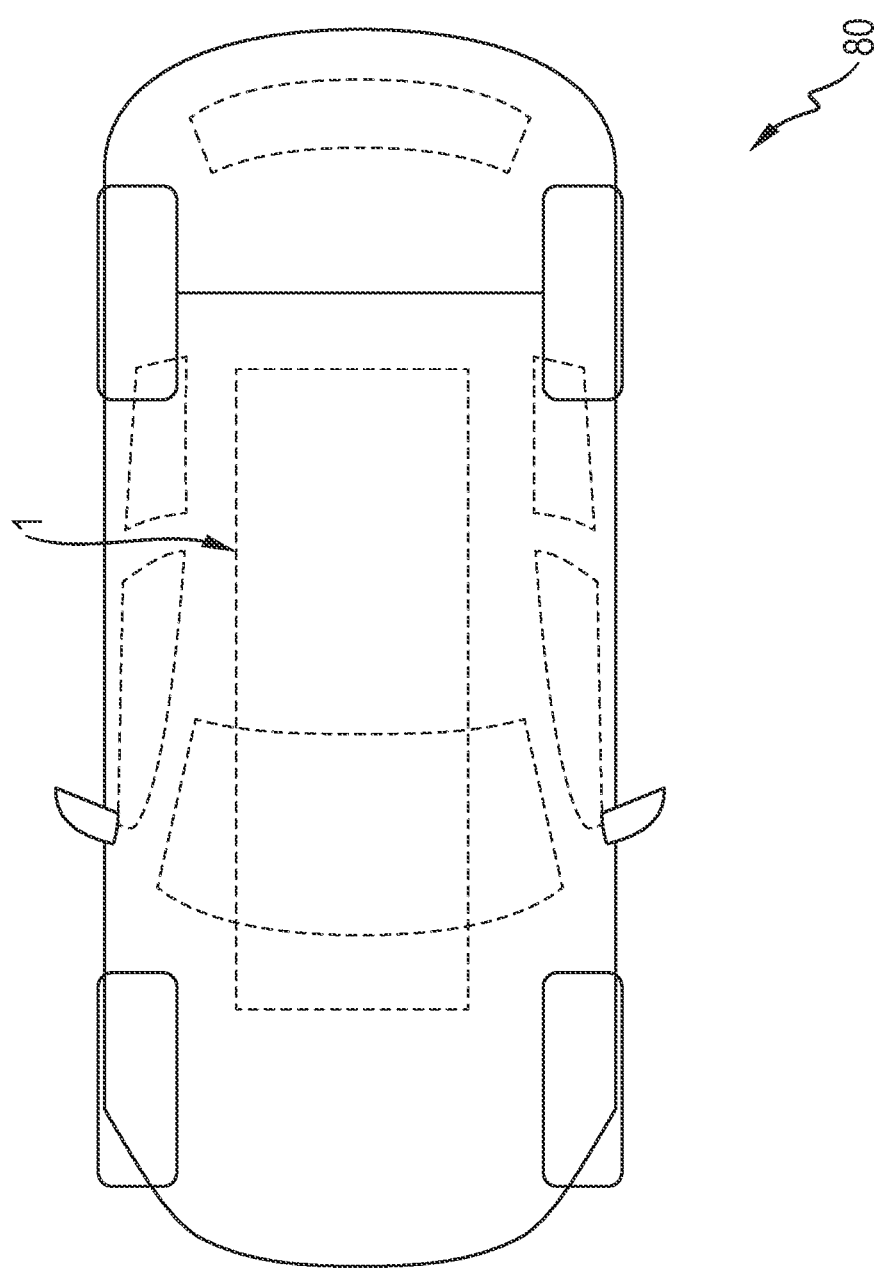

FIG. 6 shows a motor vehicle comprising a battery system 1 according to aspects of the invention. In the present case, the motor vehicle is designed in the form of an at least partially electrically operated motor vehicle. Preferably, the battery system 1 according to the present invention can be arranged in the transverse direction between two side sills within the motor vehicle 80 and can, for example, be connected, for example screwed, directly to the body of the motor vehicle 80 without additional battery box or the like.

The above explanation of the embodiments describes the present invention solely in the context of examples.

Naturally, individual features of the embodiments may be freely combined with one another, if technically meaningful, without leaving the scope of the present invention.

What is claimed is:

1. A battery module housing for accommodating at least one cell stack of battery cells for use in a motor vehicle, said battery module housing comprising:

(i) a plurality of housing units for accommodating the battery cells, (ii) a front and a rear cover member for closing the housing units, wherein the housing units are extrusion profiles and each comprise (i) a front and a rear face-side opening for introducing the battery cells and (ii) a housing wall arranged between the openings, wherein first and second housing units of the plurality of housing units are indirectly connected to one another, wherein each housing unit has a common width, a common length and a common height, and wherein the front and rear cover elements cover the front and rear face-side openings of the housing units, and (iii) an intermediate chamber for accommodating further battery cells, wherein the intermediate chamber is formed by (a) the housing walls of the first and second housing units that face one another and (b) two connecting elements in the form of metal sheets that connect the first and second housing units, wherein the intermediate chamber has a smaller width than the common width of the housing units, wherein a height and length of the intermediate chamber are the same as the common height and common length of the housing units, respectively, wherein the intermediate chamber forms a single chamber that is delimited by the housing walls of the first and second housing units and the two connecting elements, and wherein each connecting element has two ends, wherein one of the two ends is materially joined to the housing wall of the first housing unit and the other of the two ends is materially joined to the housing wall of the second housing unit.

2. The battery module housing according to claim 1, wherein each housing unit further comprises a separating wall that separates the housing unit into two chambers.

3. The battery module housing according to claim 1, further comprising a chamber for accommodating air and/or a fire protection layer that is disposed between two positively connected housing units and within a joining region, wherein adjacent side walls of the two housing units are directly connected to one another via a weld connection.

4. The battery module housing according to claim 1, wherein the housing units are connected to one another both mechanically and in a media-tight manner, wherein positive connection points are arranged between two housing units on bottom and top surfaces of the housing units.

5. The battery module housing according to claim 1, wherein the positive connection is an adhesive connection, a weld connection, a friction stir weld connection or a laser weld connection.

6. The battery module housing according to claim 1, wherein the housing units are formed from an aluminum material and/or a magnesium material and/or a fiber-reinforced plastic.

7. The battery system for use in a motor vehicle comprising the battery module housing according to claim 1 and a plurality of cell stacks arranged within the battery module housing for driving the motor vehicle.

8. The battery system according to claim 7, wherein the at least one cell stack of battery cells comprises at least three cell stacks, wherein a first cell stack of the at least three cell stacks is arranged within the first housing unit, a second cell stack of the at least three cell stacks is arranged within the second housing unit that is connected to the first housing unit, and a third cell stack of the at least three cell stacks is arranged in the intermediate chamber disposed between the first and second housing units.

9. A motor vehicle comprising the battery system according to claim 7.

10. The battery system according to claim 7, wherein the at least one cell stack of battery cells comprises two cell stacks, wherein a first cell stack of the two cell stacks is arranged within the first housing unit, a second cell stack of the two cell stacks is arranged within the second housing unit that is connected to the first housing unit, and a fire protection layer is arranged in the intermediate chamber disposed between the first and second housing units.

11. The battery module housing according to claim 1, wherein said one of the two ends is welded to the housing wall of the first housing unit and said other of the two ends is welded to the housing wall of the second housing unit.

12. The battery module housing according to claim 11, wherein the weld at said one of the two ends of one of the two connecting elements is aligned with the weld at said one of the two ends of the other of the two connecting elements.

13. The battery module housing according to claim 1, wherein said housing wall of the first housing unit is not integral with the first housing unit and is materially joined to the first housing unit along with said one of the two ends of the connecting elements.

14. The battery module housing according to claim 13, wherein said housing wall of the second housing unit is not integral with the second housing unit and is materially joined to the second housing unit along with said other of the two ends of the connecting elements.

15. The battery module housing according to claim 14, wherein each housing unit further comprises an integral separating wall that separates the housing unit into two chambers.

16. The battery module housing according to claim 1, wherein said housing wall of the first housing unit is oriented parallel to said housing wall of the second housing unit.

17. The battery module housing according to claim 1, wherein the connecting elements have a common length.

18. The battery module housing according to claim 1, wherein the housing units are mirror images of each other, wherein said housing walls of the first and second housing units that face one another are not integral with their respective housing units, wherein each housing wall is welded to one of the housing units and both connecting elements, and wherein said housing walls constitute separate components, and wherein each housing wall has a top end and a bottom end, wherein the top end intersects with and is connected to a top wall of one of the housing units and one side of one of the connecting elements and the bottom end intersects with and is connected to a bottom wall of one of the housing units and one side of one of the connecting elements.

19. The battery module housing according to claim 1, wherein each connecting element constitutes a weld.

* * * * *